(12) United States Patent
Kim et al.

(10) Patent No.: US 9,768,449 B2
(45) Date of Patent: Sep. 19, 2017

(54) ELECTRODE ASSEMBLY, METHOD FOR FABRICATING SAME, AND BATTERY CHARGING AND DISCHARGING METHOD

(71) Applicant: SHINE CO., LTD., Busan (KR)

(72) Inventors: Chang Hyeon Kim, Chungcheongnam-do (KR); Lee Hyun Shin, Busan (KR)

(73) Assignee: JENAX INC., Busan (KR)

( * ) Notice: Subject to any disclaimer, the term of this patent is extended or adjusted under 35 U.S.C. 154(b) by 489 days.

(21) Appl. No.: 14/358,840

(22) PCT Filed: Nov. 8, 2012

(86) PCT No.: PCT/KR2012/009386
§ 371 (c)(1),
(2) Date: May 16, 2014

(87) PCT Pub. No.: WO2013/073795
PCT Pub. Date: May 23, 2013

(65) Prior Publication Data
US 2014/0306665 A1  Oct. 16, 2014

(30) Foreign Application Priority Data

Nov. 17, 2011  (KR) .................. 10-2011-0120523

(51) Int. Cl.
*H01M 4/62* (2006.01)
*H01M 4/36* (2006.01)
(Continued)

(52) U.S. Cl.
CPC ........... *H01M 4/624* (2013.01); *H01M 4/043* (2013.01); *H01M 4/0404* (2013.01); *H01M 4/13* (2013.01);
(Continued)

(58) Field of Classification Search
CPC ........ H01M 4/62; H01M 4/624; H01M 4/043; H01M 4/0404; H01M 4/13; H01M 4/366; H01M 4/667
See application file for complete search history.

(56) References Cited

U.S. PATENT DOCUMENTS

| 536,996 A | * | 4/1895 | Barnett | ................. | H01M 4/587 |
| | | | | | 361/508 |
| 6,110,236 A | * | 8/2000 | Tsang | ..................... | H01M 4/04 |
| | | | | | 29/623.5 |

(Continued)

FOREIGN PATENT DOCUMENTS

| JP | 11-097074 | 4/1999 |
| JP | 2000-030750 | 1/2000 |

(Continued)

OTHER PUBLICATIONS

Machine Translation of: Miyazaki et al., JP 2006/286427, Oct. 19, 2006.*

(Continued)

*Primary Examiner* — Kenneth Douyette

(57) ABSTRACT

The present invention relates to an electrode assembly, to a method for manufacturing same, and to a battery charging and discharging method. The electrode assembly according to one embodiment of the present invention includes: an electrode collector, wherein a first electrical active material layer is stacked on the electrode collector; and a first porous conductive network layer of which at least one portion is recessed into the first electrical active material layer, wherein the first porous conductive network layer is stacked on the circumferential surface opposite to that of the first electrical active material layer contacting the electrode collector.

10 Claims, 3 Drawing Sheets

(51) Int. Cl.
- *H01M 4/13* (2010.01)
- *H01M 4/04* (2006.01)
- *H01M 4/66* (2006.01)
- *H02J 7/00* (2006.01)
- *H01M 10/44* (2006.01)
- *H01M 4/74* (2006.01)

(52) U.S. Cl.
CPC ........... *H01M 4/366* (2013.01); *H01M 4/667* (2013.01); *H01M 10/44* (2013.01); *H02J 7/007* (2013.01); *H01M 4/74* (2013.01); *Y10T 156/10* (2015.01)

(56) References Cited

U.S. PATENT DOCUMENTS

| | | | | |
|---|---|---|---|---|
| 2003/0008205 A1* | 1/2003 | Horie | ...................... | H01M 6/42 429/120 |
| 2010/0285369 A1* | 11/2010 | Takahata | ................. | H01M 4/13 429/231.95 |
| 2010/0330424 A1 | 12/2010 | Kobayashi et al. | | |

FOREIGN PATENT DOCUMENTS

| | | |
|---|---|---|
| JP | 2004-360160 | 12/2004 |
| JP | 2005-318790 | 11/2005 |
| JP | 2006-286427 | 10/2006 |
| JP | 2007-048717 | 2/2007 |
| JP | 2008-097879 | 4/2008 |
| KR | 10-2004-0079117 | 9/2004 |
| WO | WO 2010-035605 | 4/2010 |
| WO | WO 2010-137415 | 12/2010 |

OTHER PUBLICATIONS

Machine Translation of: Obana et al. JP 2007/048717, Feb. 22, 2007.*
International Search Report mailed Mar. 25, 2013 for PCT/KR2012/009368.
Written Opinion of the International Search Report mailed Mar. 25, 2013 for PCT/KR2012/009386.

* cited by examiner charging speed (C-rate)

discharging speed (C-rate)

ELECTRODE ASSEMBLY, METHOD FOR FABRICATING SAME, AND BATTERY CHARGING AND DISCHARGING METHOD

This application claims the priority of Korean Patent Application No. 10-2011-0120523, filed on Nov. 17, 2011 in the KIPO (Korean Intellectual Property Office), the disclosure of which is incorporated herein entirely by reference. Further, this application is the National Stage application of International Application No. PCT/KR2012/009386, filed Nov. 8, 2012, which designates the United States and was published in Korean. Each of these applications is hereby incorporated by reference in their entirety into the present application.

TECHNICAL FIELD

The present invention relates to a battery-related technology, and more particularly, to an electrode assembly, a method of fabricating the same, and methods of charging and discharging a battery.

BACKGROUND ART

Along with recent growth of industries related to portable electronic devices based on developments in semiconductor fabricating technologies and communication technologies and increased demands for developing alternative energies based on environment conservation demands and depletion of resources, battery-related technologies are being actively researched. Batteries include a primary battery that may be used once for a particular lifespan and a secondary battery that may be repeatedly recharged and used. As a source material of a battery, lithium is the lightest metal with the lowest standard reduction potential from among all metals known in the natural world. Therefore, when a battery is manufactured by using lithium, the battery may not only feature high energy density, but also feature a high voltage. Therefore, researches on primary batteries and secondary batteries using the lithium are being spotlighted.

A primary battery is mainly used as a main power source or a backup power source of a portable electronic device, whereas application of a secondary battery is being expanded from a battery for a small device, such as a mobile phone, a laptop PC, and a mobile display device, to a mid-size battery or a large-size battery for an electronic motor vehicle and a hybrid motor vehicle.

Such batteries are demanded to feature light weights, small volumes, high energy densities, excellent charging/discharging speed efficiency, outstanding cycling characteristics, high stability, and high economic feasibility.

DISCLOSURE OF THE INVENTION

Technical Problem

The present invention provides an electrode assembly for a battery having not only a high energy density, but also excellent charging/discharging efficiency, charging/discharging speed, and cycle characteristics.

The present invention also provides a method for easily fabricating an electrode assembly having the above-stated advantages.

The present invention also provides a method of charging or discharging a battery by using the electrode assembly having the above-stated advantages.

Technical Solution

According to an aspect of the present invention, there is provided an electrode assembly including a current collector; a first electric active material layer stacked on the current collector; and a first porous conductive network layer stacked on a main surface of the first electric active material layer opposite to a main surface of the first electric active material layer contacting the current collector and partially depressed into the first electric active material layer.

In an embodiment, the current collector may include a metal foil, a metal mesh, or a combination thereof. Furthermore, the first porous conductive network layer may include a metal foam, carbon fibers, a metal long fiber layer, and a combination thereof. Furthermore, the metal long fiber layer may have a felt-like structure.

The electrode assembly may further include a base porous conductive network layer stacked between the current collector and the first electric active material layer and at least partially depressed into the first electric active material layer. Furthermore, the electrode assembly may further include a second electric active material layer stacked on a main surface of the first porous conductive network layer opposite to a main surface of the first porous conductive network layer contacting the first electric active material layer. In this case, the electrode assembly may further include a second porous conductive network layer stacked on a main surface of the second electric active material layer opposite to a main surface of the second electric active material layer contacting the first porous conductive network layer.

In an embodiment, the second porous conductive network layer may include a metal foam, carbon fibers, a metal long fiber layer, and a combination thereof. Furthermore, the metal long fiber layer may have a felt-like structure.

In an embodiment, thickness of the first porous conductive network layer may be from about 0.5 μm to about 100 μm. Furthermore, the metal long fiber layer may include a plurality of segmented metal long fibers, and the plurality of metal long fibers may have an average length from about 10 μm to about 100 mm.

According to another aspect of the present invention, there is provided a method of fabricating an electrode assembly, the method including providing a current collector; providing a first slurry layer containing an electric active material on the current collector; providing a first porous conductive network layer on the first slurry layer; drying the first slurry layer having provided thereon the first porous conductive network layer; and pressing the first porous conductive network layer to depress at least a portion of the first porous conductive network layer into the first slurry layer.

In an embodiment, the method may further include providing a base porous conductive network layer on the current collector before the first slurry layer is provided. Furthermore, the method may further include applying a second slurry layer containing an electric active material on the first porous conductive network layer before the first slurry layer is dried; and drying the second slurry layer simultaneously as the first slurry layer is dried, wherein, in the pressing of the first porous conductive network layer, at least another portion of the first metal long fiber layer may be depressed into the second slurry layer.

In another embodiment, the method may further include providing a second porous conductive network layer on the second slurry layer before the drying of the second slurry layer simultaneously as the first slurry layer is dried. In this case, at least a portion of the second porous conductive network layer may be depressed into the second slurry layer.

The method of claim may further include, after the pressing of the first porous conductive network layer to depress at least a portion of the first porous conductive network layer into the first slurry layer, providing the second slurry layer on the first porous conductive network layer. Furthermore, the method may further include providing the second porous conductive network layer on the second slurry layer; drying the second slurry layer; and pressing the second porous conductive network layer to depress at least a portion of the second porous conductive network layer into the second slurry layer.

In an embodiment, the first porous conductive network layer may be provided when an electric field or a magnetic field is applied to the first slurry layer. In this case, an electric magnet or a permanent magnet may be used to apply the magnetic field. Alternatively, fibers constituting a porous conductive network layer may be charged. In this case, an electric field is applied.

According to another aspect of the present invention, there is provided a method of charging or discharging a battery, the method including charging a portion of nominal capacity of the battery at a first charging C-rate; and charging a remaining portion of the battery at a second charging C-rate lower than the first charging C-rate; or discharging a portion of nominal capacity of the battery at a first discharging C-rate; and discharging a remaining portion of the battery at a second discharging C-rate lower than the first discharging C-rate.

The charging method or the discharging method may be performed in conjunction with a smart grid. The battery may include the electrode assembly of claim 1.

Advantageous Effects

According to an embodiment of the present invention, since an electric active material layer is arranged between a current collector and a conductive network layer, speeds and efficiency for charging/discharging the electric active material layer may be improved. Furthermore, since the porous conductive network layer may be easily modified, stress in a battery due to change of volume of the electric active material layer during operation of the battery may be reduced, and thus an electrode assembly capable of reducing or removing irreversibility due to charging/discharging cycles may be provided.

Furthermore, according to another embodiment of the present invention, an electrode assembly having the above-stated advantages may be manufactured simply via a stacking operation, such as lamination or coating, and a pressing operation, and thus a method of fabricating an electrode assembly with improved productivity and simplified equipment may be provided.

Furthermore, according to another embodiment of the present invention, by charging remaining capacity via a plurality of phases while reducing charging C-rate or discharging remaining capacity via a plurality of phases while reducing discharging C-rate, a battery may be charged very close to its nominal capacity or discharged in reduced charging/discharging time. The charging method may be achieved via software, hardware, or a combination thereof and may be embodied by the above-stated battery managing system.

MODE FOR CARRYING OUT THE INVENTION

Figure 1:
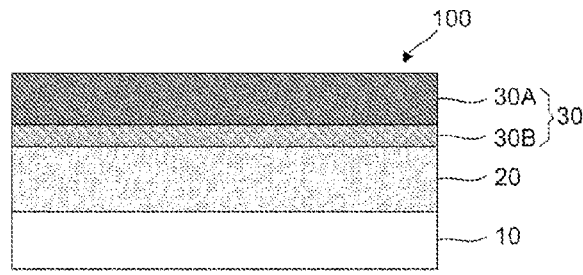
FIG. 1 is a sectional view of an electrode assembly 100 according to an embodiment of the present invention.

The present invention will now be described more fully with reference to the accompanying drawings, in which exemplary embodiments of the invention are shown.

The invention may, however, be embodied in many different forms and should not be construed as being limited to the embodiments set forth herein; rather these embodiments are provided so that this disclosure will be thorough and complete, and will fully convey the concept of the invention to one of ordinary skill in the art. Meanwhile, the terminology used herein is for the purpose of describing particular embodiments only and is not intended to be limiting of exemplary embodiments.

Also, thickness or sizes of layers in the drawings are exaggerated for convenience of explanation and clarity, and the same reference numerals denote the same elements in the drawings. As used herein, the term "and/or" includes any and all combinations of one or more of the associated listed items.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The term porous conductive network layer refers to a structure including a conductive network consisting of 1-dimensional conduction paths and porosities defined by spaces between the conduction paths. The porous conductive network layer is plastic and electro-conductive, and the present invention relates to characteristics and advantages thereof.

Furthermore, the term 'metal long fiber' refers to a metal fiber that is fabricated by fiberizing a metal, such as a stainless steel, aluminum, nickel, titanium, copper, or an alloy thereof, has a diameter from several μm to dozens of μm, and has a length of dozens of μm and a length of greater than dozens of μm. The metal long fiber not only has advantages of thermal resistance, plasticity, and electro-conductivity of a metal and but also has unique advantages of capable of weaving and felt-processing due to a fiber. The present invention relates to characteristics and advantages of application of such a metal long fiber to an electrode assembly of a battery.

The metal long fibers may be fabricated by maintaining a metal or an alloy as a molten metal in a suitable container and spurting the molten metal out the atmosphere via discharge holes of the container by using a compressed gas or a pressing device, such as a piston, for rapid solidification. Alternatively, metal long fibers may be fabricated by using the bundle drawing method known in the art. By controlling the number of the discharge holes, size of the discharge holes, and/or injection of discharged molten metal, thickness, uniformity, fibrous tissue (e.g., felt), and aspect ratio of metal long fiber may be controlled. Metal long fiber constituting a battery according to the present invention may include not only metal long fibers manufactured by using the above-stated fabricating method, but also metal long fibers manufactured by using any of other fabricating method known in the art, and the present invention is not limited thereto.

The term 'isolation layer' includes an isolation layer commonly used in a liquid electrolyte battery using a liquid electrolyte having low affinity for the isolation layer. Furthermore, the 'isolation layer' includes an intrinsic solid polymer electrolyte and/or a gel solid polymer electrolyte, which is an electrolyte or are electrolytes strongly bound to an isolation layer, so that the electrolyte and the isolation layer are recognized as a same element. Therefore, the isolation layer should be defined based on definitions given below.

FIG. 1 is a sectional view of an electrode assembly 100 according to an embodiment of the present invention.

Referring to FIG. 1, the electrode assembly 100 may include a current collector 10, an electric active material layer 20 on the current collector 10, and a 3-dimensional (3D) porous conductive network layer 30 stacked on a main surface opposite to the main surface of the electric active material layer 20 contacting the current collector 10. The current collector 10 may be a metal foil or a metal mesh having a 2-dimensional (2D) structure. Preferably, the current collector 10 may be a metal foil having a continuous facing area with respect to the 3D porous conductive network layer 30. The current collector 10 may contain aluminum or copper based on polarity of the electrode assembly 100. However, it is merely an example, and the current collector 10 may include other metals known in the art or an alloy thereof. The electric active material layer 20 on the current collector 10 may include electric active material particles and a binding material. The electric active material particles may be particles having an average size from about 0.1 μm to about 100 μm. As an occasion demands, particle size distribution of the electric active material may be controlled via a filter process.

The electric active material may be suitably selected based on polarity of the electrode assembly 100 and whether a battery is a primary battery or a secondary battery. For example, an electric active material for a cathode may be selected from among binary (or higher) system oxides, phosphates, sulfides, and fluorides containing lithium, nickel, cobalt, chrome, magnesium, strontium, vanadium, lanthanum, cerium, iron, cadmium, lead, titanium, molybdenum, or manganese, or a combination thereof. However, those are merely examples, and the electric active material for a cathode may be formed of other chalcogenide compounds. Preferably, the electric active material for a cathode may be a ternary system compound containing at least two from among metals suitable for a lithium secondary battery, such as cobalt, copper, nickel, manganese, titanium, and molybdenum, and at least one non-metal atom selected from a group consisting of O, F, S, P, and combinations thereof; e.g., Li[Ni, Mn, Co]O2.

An electric active material for an anode may be a carbon-based material, e.g., a low crystalline carbon or a high crystalline carbon. The low crystalline carbon may be soft carbon or hard carbon, for example. The high crystalline carbon may be natural graphite, Kish graphite, pyrolytic carbon, mesophase pitch based carbon fiber, meso-carbon microbeads, Mesophase pitches, or a high temperature plastic carbon, such as petroleum or coal tar pitch derived cokes, for example. However, the above-stated materials are merely examples, and other carbon-based materials, such as diamond-based materials or carbine-based materials, may be applied.

In another embodiment, lithium powders may be used instead of the carbon-based materials stated above. Alternatively, an electric active material for an anode may include a carbon-based material and a non-carbon-based active material suitable for an NaS battery, that is, sodium or at least one from among other oxides, carbides, nitrides, phosphides, selenides, and tellurides. Alternatively, to increase capacity of an anode, a non-carbon-based material with high lithium ion occlusion and discharge capability may be used, e.g., a monoatomic material, such as silicon, germanium, tin, lead, antimony, bismuth, zinc, aluminum, iron, or cadmium, an inter-metallic compound thereof, or an oxide thereof.

In the other embodiment, an electric active material containing a highly-efficient Li intercalation metal with high capacity with high volume variation, such as silicon (Si), bismuth (Bi), tin (Sn), aluminum (Al) or alloy thereof, or an inter-metallic compound thereof may be used.

In an embodiment, a binder may be added to the electric active material layer 20 for binding electric active materials in particle state. For example, the binder may be a polymer-based material including vinylidenefluoride-hexafluoropropylene copolymer (PVdF-co-HFP), polyvinylidenefluoride (PVdF), polyacrylonitrile, polymethylmethacrylate, polytetrafluoroethylene (PTFE), styrenebutadiene rubber (SBR), polyimide, a polyurethane-based polymer, a polyester-based polymer, and ethylene-propylene-diene copolymer (EPDM). As an occasion demands, the binder may include another conductive polymer-based material, a pet petroleum pitch, and coal tar. However, the present invention is not limited thereto, and any material may be used as the binder as long as the material is not dissolved in an electrolyte and features predetermined binding force and stability under an electrochemical environment.

The binder may be added in a weight ratio of from about 0.5% to about 5% with respect to the overall mixture weight of the electric active material and the binder. Since an organic solvent or water is used as a dispersion medium for the binder, it takes time to dry the dispersion medium, and the dispersion medium may remain in the electric active material after drying and may deteriorate cycling characteristics of a battery. Furthermore, since the binder is a non-conductor, it is preferable to limit usage of the binder. In the electrode assembly 100 according to the present embodiment, the electric active material in the particle state is strongly bound between the current collector 10 and the 3D porous conductive network layer 30, and thus usage of the binder may be minimized.

In an embodiment, particularly, in case of an electric active material for a cathode, a conductor may further be externally added into the electric active material layer 20, together with the electric active material and the binder. The conductor may be uniformly mixed with the electric active material and provided on the current collector 10. The conductor may be added in a weight ratio of from about 1% to about 15% with respect to the overall mixture weight of the electric active material, the binder, and the conductor. The conductor may be a nanostructure with a large specific surface area and low resistance, e.g., a fine carbon, such as carbon black, acetylene black, Ketjen black, or ultrafine graphite particles, nano-metal particle paste, indium tin oxide (ITO) paste, or carbon nanotubes.

The 3D porous conductive network layer 30 is a conductive network layer formed of a metal foam, a metal long fiber layer, a carbon fiber layer, or a combination thereof. The 3D porous conductive network layer 30 may be a metal long fiber layer, such as a conductive fiber layer or a carbon fiber layer. Preferably, the 3D porous conductive network layer 30 may be a metal long fiber layer. A portion of or the entire 3D porous conductive network layer 30 disposed on the electric active material layer 20 may be depressed into the electric active material layer 20 via a pressing operation described below. When a portion of the 3D porous conductive network layer 30 is depressed into the electric active material layer 20, a high-density porous conductive network layer 30A is formed on a surface of the electric active material layer 20, and the depressed portion of the 3D porous conductive network layer 30 may be mixed with an electric active material, a binder, and other externally added materials in the electric active material layer 20 and may provide a low-density porous conductive network layer 30B. As described above, as at least a portion of the 3D porous conductive network layer 30 is depressed into the electric active material layer 20, a mechanical adhesion between 3D porous conductive network layer 30 and the electric active material layer 20 may be secured.

When the 3D porous conductive network layer 30 is formed of a metal long fiber layer, the metal long fiber layer may have a felt-like structure consisting of a plurality of metal long fibers. The metal long fibers may include one from among a stainless steel, aluminum, nickel, titanium, and copper, or an alloy thereof. The felt-like structure may form a 3D porous fibrous structure formed as a plurality of metal long fibers are bent, tangled with one another, or bridged with one another due to fibrous properties of the metal long fibers. Therefore, the metal foam is formed chemically or integrally not to separate 1D linear structures providing conduction paths from one another. The metal foam may be distinguished from a metal long fiber layer in which metal long fibers are tangled or bridged with one another.

The metal long fibers may be segmented, and the average length of the segmented metal long fibers may be from about 10 µm to about 100 mm. Furthermore, the metal long fibers may have thicknesses from about 1 µm to about 50 µm. When thicknesses of the metal long fibers are smaller than or equal to 1 µm, it is difficult to form a structure by using metal long fibers and to artificially arrange metal long fibers, and thus it is difficult to secure machinability. On the other hand, if thicknesses of the metal long fibers are equal to or greater than 100 µm, it may be difficult to depress the metal long fibers into an electric active material layer. As a result, voltage division effect as described below may be deteriorated. Furthermore, as strength of the metal long fibers increase, machinability of an electrode assembly may be deteriorated during an operation for packaging a battery. Preferably, the metal long fibers may have thicknesses from about 1 µm to about 10 µm.

Thickness off the electric active material layer 20 may depend on particle size of an electric active material and may have a thickness from about 20 µm to about 400 µm to have a suitable capacity. Furthermore, thickness of the 3D porous conductive network layer 30 is from about 0.5 µm to about 100 µm and may be from about 10 µm to about 40 µm. Since thickness of the 3D porous conductive network layer 30 may become a factor that increases volume of a battery, thickness of the 3D porous conductive network layer 30 may be limited within the range as described above in terms of energy density.

Figure 2A:
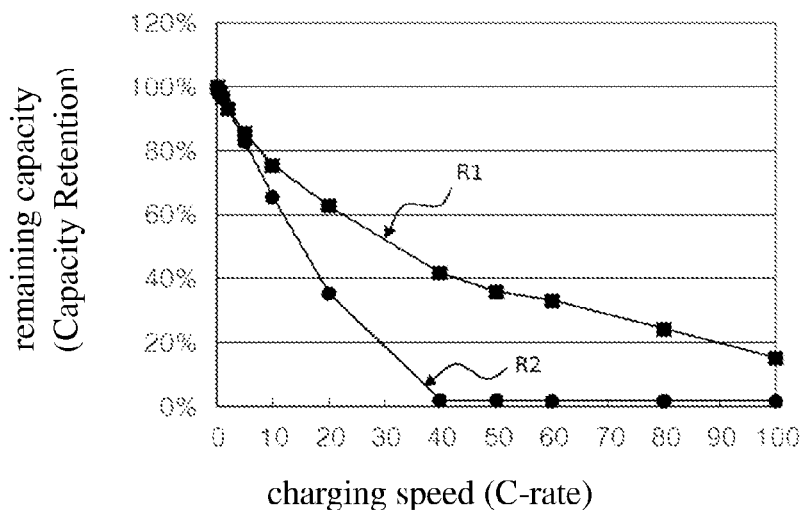
FIG. 2A is a graph showing charging characteristics of an electrode assembly according to an embodiment of the present invention as shown in FIG. 1 and an electrode assembly including the current collector and the electric active material layer without the 3D porous conductive network layer 30 according to a comparative embodiment.
Figure 2B:
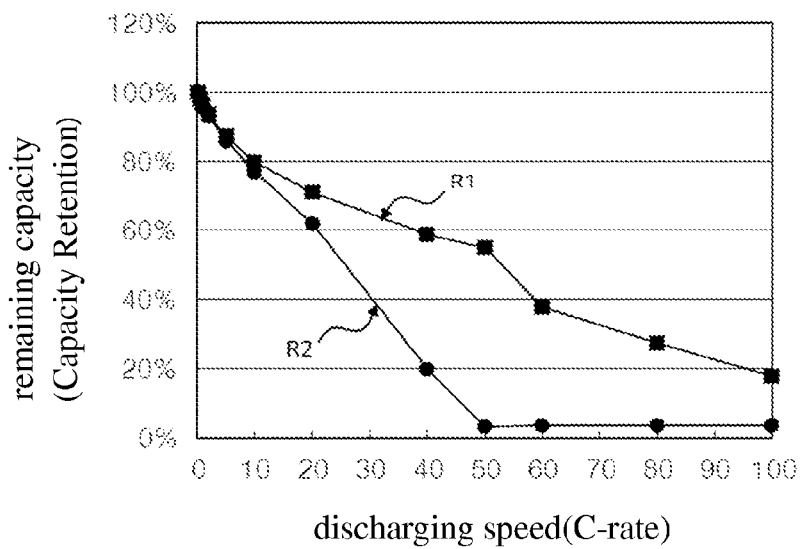
FIG. 2B is a graph showing discharging characteristics of the electrode assembly according to an embodiment of the present invention and the electrode assembly according to the comparative embodiment.

FIG. 2A is a graph showing charging characteristics of an electrode assembly (100 of FIG. 1) according to an embodiment of the present invention as shown in FIG. 1 and an electrode assembly including the current collector 10 and the electric active material layer 20 without the 3D porous conductive network layer 30 according to a comparative embodiment, and FIG. 2B is a graph showing discharging characteristics of the electrode assembly (100 of FIG. 1) according to an embodiment of the present invention and the electrode assembly according to the comparative embodiment. In these graphs, a curve R1 denotes values measured with respect to the electrode assembly 100 of FIG. 1, whereas a curve R2 denotes values measured with respect to the electrode assembly according to the comparative embodiment.

In the above-stated electrode assemblies for evaluation, lithium-ion phosphate is used as an electric active material for a cathode, where a slurry is formed by dispersing the lithium-ion phosphate into an N-methyl pylolidone (PMP) solvent. Next, a cathode assembly is fabricated by coating an aluminum foil with the slurry. Electric active material layers applied to the both samples have a same thickness of about 40 µm, and a porous conductive network layer using a metal long fiber layer according to an embodiment of the present invention is formed to have a thickness of about 10 µm. A battery employing the sample is a half battery using a lithium-based metal as an anode.

Referring to FIG. 2A, capacity of a battery employing the electrode assembly according to an embodiment of the present invention (the curve R1) slowly decreases as charging speed increases, where 40% or more of nominal capacity is maintained at a charging speed of 40 C-rate. However, a battery employing the electrode assembly according to the comparative embodiment (the curve R2) features rapid decrease of capacity as charging speed increases and is barely charged at the charging speed of 40 C-rate.

Referring to FIG. 2B, similar in FIG. 2A, capacity of the battery employing the electrode assembly according to an embodiment of the present invention (the curve R1) slowly decreases as discharging speed increases. However, the battery employing the electrode assembly according to the comparative embodiment (the curve R2) features rapid decrease of capacity as discharging speed increases and is barely discharged at the charging speed of 50 C-rate.

Generally, a battery used by an electric power tool requires an output characteristic of about 10 C-rate, and a hybrid electric vehicle (HEV) requires an output characteristic of about 40 C-rate based on its performance. According to an embodiment of the present invention, high output characteristic may be obtained for an electronic device or a power device requiring high output power in response to such requirement. Furthermore, referring to the case corresponding to 40 C-rate in FIG. 2A, a high capacity battery may be charged to 40% or more within minutes, according to an embodiment of the present invention. Generally, when thickness of an electric active material is reduced, resistance of an electrode or resistance of lithium ions is reduced, and thus rate performance may be improved. However, in this case, an amount of the electric active material is reduced, and thus capacity of a battery is also reduced. However, according to an embodiment of the present invention, rate performance may be improved without reducing thickness of an electric active material. The reason thereof may be that the porous conductive network layer as an intermediate electrode is disposed between the current collector 10 and the electric active material layer, thus provide voltage division effect within an electrode structure. Furthermore, the effect may be obtained based on effective reduction of resistance inside the electrode assembly due to the porous conductive network layer.

When the porous conductive network layer 30 is a metal long fiber layer having a felt-like structure, some of wires constituting the metal long fiber layer may penetrate into the electric active material layer 20. As a result, not only resistance inside the electrode assembly 100 may be reduced, but also a strong electric field may be locally formed inside the electric active material layer 20. Such a strong electric field contributes to improvements in speeds and efficiency for charging/discharging the electrode assembly.

FIGS. 3A through 3D are sectional views showing a method of fabricating an electrode assembly according to an embodiment of the present invention.

Figure 3A:
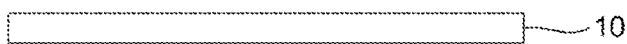
FIGS. 3A through 3D are sectional views showing a method of fabricating an electrode assembly according to an embodiment of the present invention.
Figure 3B:
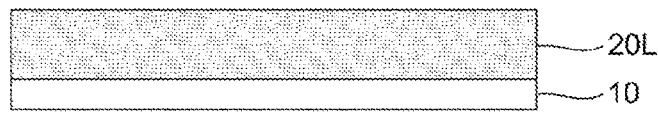

Referring to FIG. 3A, the current collector 10 is prepared. The current collector 10 may be a metal foil or a metal mesh as described above. Referring to FIG. 3B, a slurry layer 20L including an electric active material and a binder and selectively including a conductor and a suitable solvent is applied onto the current collector 10.

Figure 3C:
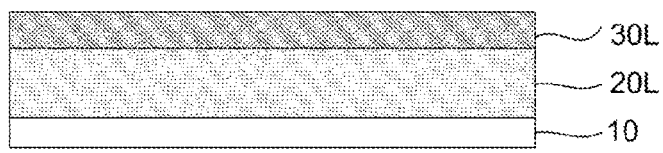

Next, referring to FIG. 3C, a porous conductive network layer 30L is formed on the slurry layer 20L. The porous conductive network layer 30L may have a structure including a metal foam, carbon fibers, a metal long fiber layer, or a combination of carbon fibers and metal long fibers. The metal long fiber layer may have a felt-like structure consisting of a plurality of metal long fibers. In an embodiment, the metal foam or the metal long fiber layer is provided in the shape of being wound around a revolving roll, and the metal foam or the metal long fiber layer may be laminated on the slurry layer 20L by unwinding the revolving roll before the slurry layer 20L is dried.

According to another embodiment of the present invention, the porous conductive network layer 30L may be provided by irregularly arranging a plurality of metal long fibers on the slurry layer 20L. For example, metal long fibers or carbon fibers may be irregularly applied onto the slurry layer 20L by using a spraying device, such as an air spray or a corona gun, wet or dry. At this point, a magnetic field may be applied to the slurry layer 20L by using an electric magnet or a permanent magnet or an electric field may be applied to the slurry layer 20L after the fibers are charged, thereby helping the fibers to be depressed into or settled in the slurry layer 20L.

Next, the structure including the porous conductive network layer 30L is dried. A drying operation may be hot-air drying, natural drying, or vacuum drying.

Figure 3D:
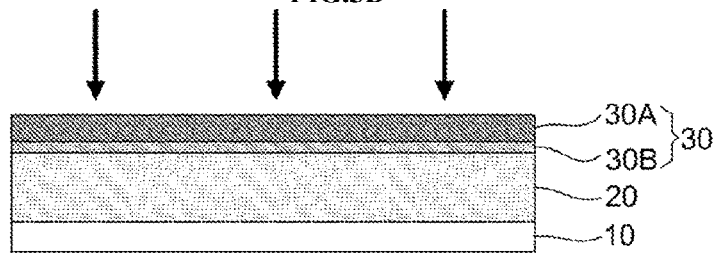

Referring to FIG. 3D, after the slurry layer 20L is dried, the structure may be pressed by using a pressing device, such as a roll press, thereby depressing at least a portion of the porous conductive network layer 30 into the electric active material layer 20. When only a portion of the porous conductive network layer 30 is depressed into the electric active material layer 20, a portion of the porous conductive network layer 30 remaining on a surface of the electric active material layer 20 becomes a high-density porous conductive network layer 30A. On the other hand, the portion of the porous conductive network layer 30 depressed into the electric active material layer 20 is mixed with an electric active material, a binder, and other externally added materials inside the electric active material layer 20, and thus a low-density porous conductive network layer 30B may be provided inside the electric active material layer 20.

In this case, compared to density of the porous conductive network layer 30 before a pressing operation, density of the porous conductive network layer 30A on the electric active material layer 20 becomes higher than density of the porous conductive network layer 30 during the lamination due to the pressing operation, whereas density of the porous conductive network layer 30B depressed into the electric active material layer 20 may decrease. As described above, according to an embodiment of the present invention, density of the portion of the porous conductive network layer 30A on a surface of the electric active material layer 20 becomes different from density of the nearby portion of the porous conductive network layer 30B inside the electric active material layer 20.

Figure 4A:
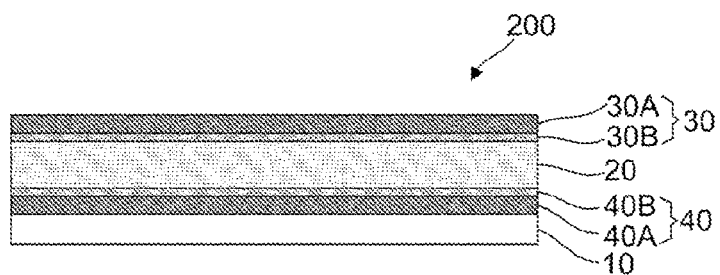
FIG. 4A is a sectional diagram showing an electrode assembly according to another embodiment of the present invention.
Figure 4B:
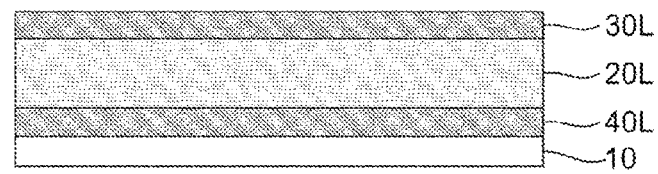
FIG. 4B is a sectional diagram showing a method of fabricating the electrode assembly.

FIG. 4A is a sectional diagram showing an electrode assembly 200 according to another embodiment of the present invention, and FIG. 4B is a sectional diagram showing a method of fabricating the electrode assembly 200.

Referring to FIG. 4A, the electrode assembly 200 is identical to the electrode assembly 100 shown in FIG. 1A except that the electrode assembly 200 further comprises a base porous conductive network layer 40 stacked between the current collector 10 and the electric active material layer 20 and partially depressed into the electric active material layer 20.

The base porous conductive network layer 40 may be formed of a metal foam, carbon fibers, a metal long fiber layer, or a combination thereof. Preferably, the base porous conductive network layer 40 may be formed of a metal long fiber layer or carbon fibers. More preferably, the base porous conductive network layer 40 may be formed of a metal long fiber layer. The metal long fiber layer may have a felt-like structure. A portion of or the entire base porous conductive network layer 40 may be depressed into the electric active material layer 20 via a pressing operation as described above.

When only a portion of the base porous conductive network layer 40 is depressed into the electric active material layer 20, a high-density porous conductive network layer 40A is formed between the current collector 10 and the electric active material layer 20, and the depressed portion of the base porous conductive network layer 40 may be mixed with an electric active material, a binder, and other externally added materials in the electric active material layer 20 and may provide a low-density porous conductive network layer 40B. Due to the depressed portion of the base porous conductive network layer, a mechanical adhesion between the base porous conductive network layer 40 and the electric active material layer 20 may be secured and resistance inside the electric active material layer 20 may be reduced.

The metal long fibers may contain one from among a stainless steel, aluminum, nickel, titanium, and copper, or an alloy thereof. The felt-like structure as described above is a porous fibrous structure formed as a plurality of metal long fibers are bent, tangled with one another, or bridged with one another due to fibrous properties of the metal long fibers.

Similar to the porous conductive network layer 30 as described above, the metal long fibers constituting the base porous conductive network layer 40 may be segmented, and the average length of the segmented metal long fibers may be from about 10 μm to about 100 mm. Furthermore, the metal long fibers may have thicknesses from about 1 μm to about 50 μm. Preferably, the metal long fibers may have thicknesses from about 1 μm to about 10 μm. When thicknesses of the metal long fibers are smaller than or equal to 1 μm, the metal long fibers have insufficient strength and may be easily broken as being tangled during a bridging process, and thus it may be difficult to form a conductive network. On the other hand, when thicknesses of the metal long fibers are equal to or greater than 10 μm, the metal long fibers may be too thick to be depressed into the electric active material layer 20, and thus thickness of an electrode may be increased. As a result, a distance between an anode and a cathode may be increased. In this case, internal resistance may be increased against movement of lithium ions.

Referring to FIG. 4B, to provide the electrode assembly 200, a base porous conductive network layer 40L may be formed on the current collector 10 before the slurry layer 20L containing an electric active material is applied onto the current collector 10. Next, as described above with reference to FIGS. 3B and 3C, the slurry layer 20L containing the electric active material may be applied onto the base porous conductive network layer 40L, and the porous conductive network layer 30L may be stacked on the slurry layer 20L containing the electric active material.

Next, the structure including the porous conductive network layer 30L is dried, and, as shown in FIG. 3D, the structure is pressed by using a pressing device, such as a roll press, and thus the electrode assembly 200 including the electric active material layer (20 of FIG. 4A) having depressed thereinto a portion of the porous conductive network layer 30 and a portion of the base porous conductive network layer 40 may be manufactured.

Figure 5:
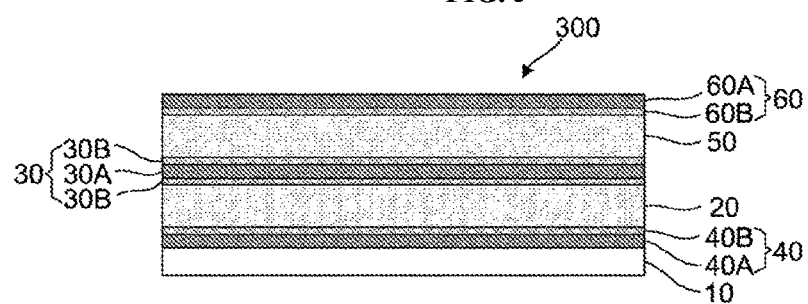
FIG. 5 is a sectional diagram showing an electrode assembly according to another embodiment of the present invention.

FIG. 5 is a sectional diagram showing an electrode assembly 300 according to another embodiment of the present invention.

Referring to FIG. 5, the electrode assembly 300 is similar to the electrode assembly 200 shown in FIG. 4A except that the electrode assembly 300 has a plurality of stacked structure further including a second electric active material layer 50 and a second porous conductive network layer 60. The second electric active material layer 50 is stacked on a main surface of a first porous conductive network layer 30 opposite to the main surface of the first porous conductive network layer 30 contacting a first electric active material layer 20.

In an embodiment, the base porous conductive network layer 40 and/or the second porous conductive network layer 60 may be omitted. In this case, an electrode assembly structure in which the porous conductive network layer 30 is completely buried in the electric active material layers 20 and 50 may be obtained. The buried porous conductive network layer 30 may function as an intermediate electrode layer.

In terms of a fabricating method, the electric active material layers 20 and 50 may be provided in the form of a slurry as described above, and the porous conductive network layers 30 and 60 may be stacked before the slurry is dried. Next, via a pressing operation, portions of the porous conductive network layers 30 and 60 may be depressed into the electric active material layers 20 and 50. As a result, high-density porous conductive network layers 30A, 40A, and 60A and low-density porous conductive network layers 30B, 40B, and 60B may be provided in the electrode assembly 300.

In another embodiment, operations for drying the slurries may be sequentially performed in the stacking order of the stacked structure. For example, at least a portion of the first porous conductive network layer 30 may be depressed into the first electric active material layer 20 by successively stacking a slurry layer for forming the first electric active material layer 20 and the first porous conductive network layer 30, drying the same, and pressing the same. Next, the second porous conductive network layer 60 may be depressed into the second electric active material layer 50 by successively stacking a slurry layer for forming the second electric active material layer 50 and the second porous conductive network layer 60 on the first porous conductive network layer 30 and drying the same. At this point, the first porous conductive network layer 30 is also depressed into the second electric active material layer 50.

According to the above-stated embodiments, although charging/discharging capacity is increased by increasing thickness of electric active material layers by stacking the plurality of electric active material layers 20 and 50, an effect of thickness division of the overall electric active material layers may be obtained due to the porous conductive network layers 30 and 60 functioning as an intermediate electrode. Resistance inside the electrode assembly 300 may be reduced, and thus, charging/discharging speeds and efficiency may be improved. Thickness of the overall electrode assembly excluding the current collector 10 may be from about 300 μm to about 600 μm.

Figure 6:
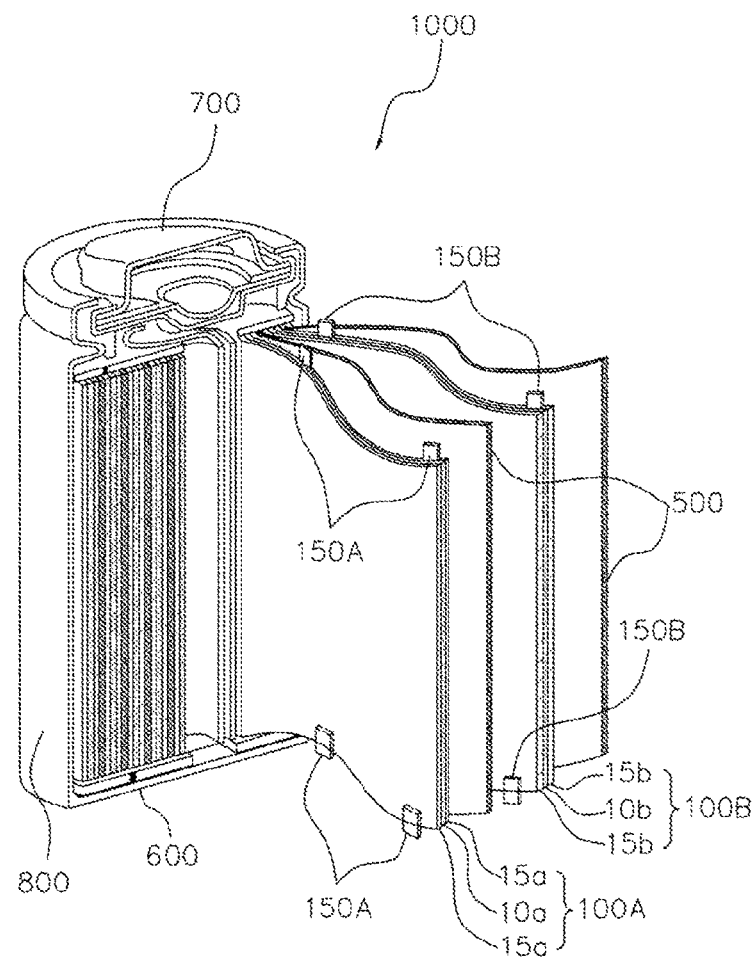
FIG. 6 is an exploded perspective view of a battery employing an electrode structure according to an embodiment of the present invention.

FIG. 6 is an exploded perspective view of a battery 1000 employing an electrode structure according to an embodiment of the present invention.

Referring to FIG. 6, the battery 1000 may be a common cylindrical battery. To increase a battery reaction area, cathode and anode 100A and 100B using the electrode structures as described above may be alternately stacked as a roll structure packaged inside a housing 800. Tabs 150A and 150B may be respectively combined with first end portions of electrode structures 100A and 100B. The plurality of tabs 150A and 150B may be repeatedly arranged at a constant interval to minimize resistance.

Each of the electrode structures 100A and 100B includes current collectors 10a and 10b corresponding to the suitable polarities as described above and active electrode layers 15a and 15b including electric active material layers having the corresponding polarities and porous conductive network layers. The active electrode layers 15a and 15b may be stacked on two opposite main surfaces of the current collector 10, respectively. For insulation between the cathode and the anode 100A and 100B, a separator 500 may be arranged between the cathode and the anode 100A and 100B.

The separator 500 may be a polymer-based fine porous film, a fabric, a felt, a ceramic, an intrinsic solid polymer electrolyte film, a gel solid polymer electrolyte film, or a combination thereof, for example. The intrinsic solid polymer electrolyte film may include a linear polymer material or a bridged polymer material. The gel solid polymer electrolyte film may be a polymer containing a plasticizer including a salt, a filler-containing polymer, a pure polymer, or a combination thereof. For example, the solid electrolyte layer may include a polymer matrix formed of polyethylene, polypropylene, polyimide, polysulfone, polyurethane, polyvinyl chloride, polystyrene, polyethylene oxide, polypropylene oxide, polybutadiene, cellulose, carboxymethylcellulose, nylon, polyacrylonitrile, polyvinylidene fluoride, poly tetrafluoroethylene, copolymer of vinylidene fluoride and hexafluoropropylene, copolymer fo vinylidene fluoride and trifluoroethylene, copolymer of vinylidene fluoride and tetrafluoroethylene, polymethylacrylate, polyethylacrylate, polymethylmetacrylate, polyethylmetacrylate, polybutylacrylate, polybutylmetacrylate, polyvinyl acetate, polyvinyl alcohol, or a combination thereof, a binder, and an electrolyte liquid. The above-stated materials regarding the separator 500 are merely examples, and a material for forming the separator 500 may be a material that is easily deformable, has excellent mechanical strength, is not teared or broken due to deformation of the electrode structures 100A and 100B, and features arbitrary and appropriate electron insulation and excellent ion conduction.

The separator 500 may be a single layer or a multi-layer, where the multi-layer may be a stacked structure of same single layers or a stacked structure of single layers formed of different materials. For example, the stacked structure may have a structure including a ceramic coating layer on a surface of a polymer electrolyte film, such as polyolefin. Thickness of the separator 500 is from about 10 μm to about 300 μm in consideration of durability, shutdown function, and safety of a battery, may preferably be from about 10 μm to about 40 μm, and may more preferably be from about 10 μm to about 25 μm.

The battery 1000 is electrically connected to external electrode terminals 600 and 700 via the tabs 150A and 150B respectively combined with the electrode structures 100A and 100B. Inside the housing 800, a suitable aqueous electrolyte containing a salt, such as potassium hydroxide (KOH), potassium bromide (KBr), potassium chloride (KCl), zinc chloride (ZnCl2), or sulfuric acid (H2SO4) or a non-aqueous electrolyte containing a lithium salt (e.g., LiClO4 or LiPF6), such as ethylene carbonate, propylene carbonate, dimethyl carbonate, or diethyl carbonate, is absorbed by the electrode structures 100A and 100B and/or the separator 500, thereby completing the battery 1000. Although not shown, a suitable battery management system for controlling stability and/or power supply characteristics during usage of the battery 1000 may be additionally attached.

The electrode assembly stated above may not only be a cylindrical battery as described above, but also may have any of various volumes for controlling capacity of a battery. Furthermore, according to an embodiment of the present invention, based on ease of formation of a porous conductive network, a battery having various shapes other than the cylindrical shape as described above may be provided via a 3-dimensional deformation of an electrode assembly, such as stacking, bending, or winding.

Furthermore, a battery according to an embodiment of the present invention may be applied as a small-size battery to be attached to a clothing or a bag or integrated with a fabric of a clothing or a bag. Alternatively, a battery according to an embodiment of the present invention may feature high capacity and/or high output power and may be applied as a mid-size or large-size battery for a power supply of an automobile or power storage.

Figure 7:
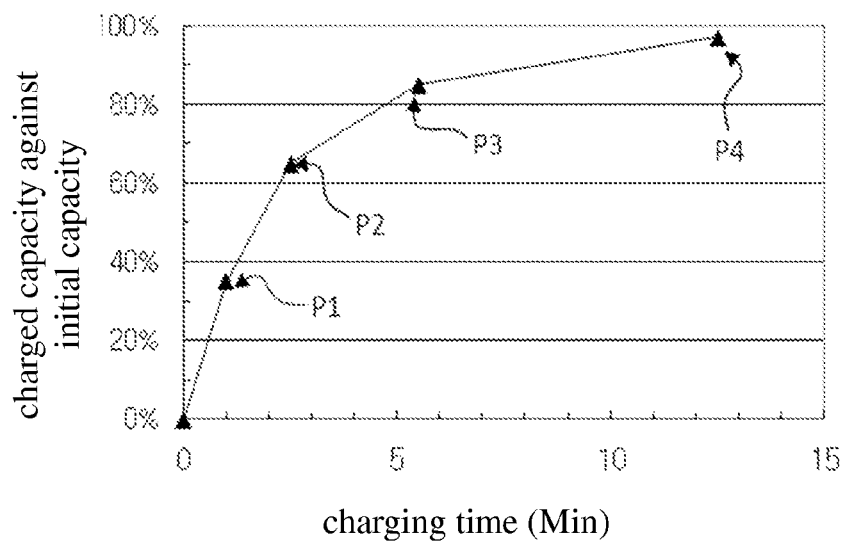
FIG. 7 is a graph showing a charging method including a plurality of charging phases according to an embodiment of the present invention.

FIG. 7 is a graph showing a charging method including a plurality of charging phases according to an embodiment of the present invention.

Referring to FIG. 7, a battery may be charged in 4 phases, for example. The battery used herein is a half battery including an electrode assembly structure according to an embodiment of the present invention as shown in FIG. 1.

In a first phase P1, the battery is charged at 60 C-rate, where 35% of nominal capacity of the battery is charged in 1 minute. Next, in the next phase P2, when the battery is charged for 1 minute 30 seconds at 20 C-rate, 65% of nominal capacity of the battery is charged. In the next phase P3, when the battery is charged for 3 minutes at 5 C-rate, 85% of nominal capacity of the battery is charged. In the final phase P4, the battery is charged for 7 minutes at 1 C-rate, and 97% (close to 100%) of nominal capacity of the battery is charged.

According to the present embodiment, 97% of nominal capacity of the battery may be charged in total 12 minutes and 30 seconds, and thus the overall charging time may be reduced. Although charging is performed in 4 phases in the above-stated embodiment, it is merely an example, and the present invention is not limited thereto. For example, charging may be performed in 2 phases, 3 phases, or 5 or more phases while gradually reducing C-rates. Furthermore, C-rates at the high-speed charging phases may be arbitrary values smaller than or equal to 100 C-rate, whereas C rate at the final slow charging phase may be an arbitrary value equal to or greater than 0.1 C-rate.

As described above, by charging remaining capacity of a battery via a plurality of phases while reducing C-rate, the battery may be charged to a level close to nominal capacity of the battery in reduced charging time. The charging method may be achieved via software, hardware, or a combination thereof and may be embodied by the above-stated battery managing system.

Although the above-stated embodiment is given in relation to a charging method, the same embodiment may be applied to a discharging method. In other words, a battery may be discharged in a plurality of phases. For example, the battery may be discharged at a high C-rate in the initial discharging phase, and then the battery may be discharged while gradually reducing C-rate. By discharging a battery as described above, large energy may be obtained from the battery within a short period of time.

The above-stated charging/discharging characteristics may embody an efficient power management system in conjunction with a smart grid system. For example, power may be stored in and discharged from a single battery regardless of load characteristics of various power supplies, such as nuclear power, solar power, and hydroelectric power, and various power consumers, such as plants and households.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An electrode assembly comprising:
a current collector;
a first electric active material layer stacked on the current collector; and
a first porous conductive network layer comprising a plurality of metal long fibers stacked as an exposed uppermost layer on a first main surface of the first electric active material layer opposite to a second main surface of the first electric active material layer contacting the current collector,
wherein only a portion of the plurality of metal long fibers is depressed into the first main surface of the electric active material layer so as to obtain a mechanical coupling between the porous conductive network layer and the electric active material layer, thereby ensuring a 3-dimensional deformation of the electrode assembly via at least one of stacking, bending and winding of the electrode assembly,
wherein the porous conductive network layer is rendered to be electrical conductive by bending, tangling and bridging the plurality of metal long fibers to each other and includes a nonwoven fabric structure consisting of a plurality of segmented metal long fibers, thereby locally forming an electric field inside the electric active material layer to improve speed and efficiency for charging and discharging the electrode assembly,
wherein thickness of the plurality of metal long fibers is over 1 μm and below 10 μm,
wherein the plurality of metal long fibers have an average length between 10 μm and 100 mm,
wherein the nonwoven fabric structure includes a high-density porous conductive network layer formed on the first main surface of the first electric active material layer and a low-density porous conductive network layer depressed into the first electric active material layer.

2. The electrode assembly of claim 1, wherein the current collector comprises a metal foil, a metal mesh, or a combination thereof.

3. The electrode assembly of claim 1, wherein the metal long fiber layer has a felt-like structure.

4. The electrode assembly of claim 1, further comprising a base porous conductive network layer stacked between the current collector and the first electric active material layer, and at least partially depressed into the first electric active material layer.

5. The electrode assembly of claim 1, further comprising a second electric active material layer stacked on a main surface of the first porous conductive network layer opposite to a main surface of the first porous conductive network layer contacting the first electric active material layer.

6. The electrode assembly of claim 5, further comprising a second porous conductive network layer stacked on a main surface of the second electric active material layer opposite to a main surface of the second electric active material layer contacting the first porous conductive network layer.

7. The electrode assembly of claim 6, wherein the second porous conductive network layer comprises a metal foam, carbon fibers, a metal long fiber layer, and a combination thereof.

8. The electrode assembly of claim 7, wherein the metal long fiber layer has a felt-like structure.

9. The electrode assembly of claim 1, wherein thickness of the first porous conductive network layer is from about 0.5 μm to about 100 μm.

10. The electrode assembly of claim 1, wherein the metal long fiber layer comprises a plurality of segmented metal long fibers, and the plurality of metal long fibers have an average length from about 10 μm to about 100 mm.

* * * * *